United States Patent [19]

Smith et al.

[11] 4,133,346
[45] Jan. 9, 1979

[54] PRESSURE VACUUM RELIEF VALVE

[75] Inventors: Claude A. Smith, Huron; Donald L. Williams, Port Clinton, both of Ohio

[73] Assignee: General Motors Corporation, Detroit, Mich.

[21] Appl. No.: 804,141

[22] Filed: Jun. 6, 1977

[51] Int. Cl.² ............................................. B65D 51/16
[52] U.S. Cl. ................................. 137/493.6; 220/203; 137/493.9
[58] Field of Search ................. 137/493, 493.9, 43, 137/493.6; 220/203, 204, 209

[56] References Cited
U.S. PATENT DOCUMENTS

| 2,164,450 | 7/1939 | Eshbaugh | 220/203 |
| 2,191,611 | 2/1940 | Eshbaugh | 137/493 X |
| 2,521,201 | 9/1950 | Clark | 220/203 |
| 3,067,770 | 12/1962 | Fancher | 137/493 |

Primary Examiner—Harold W. Weakley
Attorney, Agent, or Firm—J. C. Evans

[57] ABSTRACT

A pressure control valve assembly includes a valve housing having a spring loaded, resilient valve element with reversely curved conical surfaces thereon one of which is seated on a fixed, annular pressure relief seat by a first spring element and the other of which is seated against a spring biased ball check valve that controls flow through a central opening in the valve element defining a vacuum relief path.

5 Claims, 2 Drawing Figures

PRESSURE VACUUM RELIEF VALVE

This invention relates to pressure control valve and more particularly to combination vacuum and pressure relief valve assemblies for controlling pressure within an associated container upon a predetermined build-up therein and by the inclusion of means to communicate the interior of the container with ambient atmosphere upon a predetermined vacuum condition in the container.

Various semi-closed fluid systems include a control valve assembly having a pressure relief valve and a vacuum relief valve located between an inlet and an outlet to control pressure in a container.

For example, the container can be in the form of a fuel tank in an automotive fuel system. In order to meet evaporative emission control standards for automotive fuel systems, the fuel tank must be semi-closed so that vapors generated therein are routed to a carbon filled cannister which is associated with means to store vapor when the automotive engine is not operative and which will purge itself when the engine is running. In such an arrangement, pressure and vacuum relief valves are connected to the tank so that pressure relief will occur to atmosphere when there is an excessive pressure build up in the tank. The vacuum relief valve directs ambient pressure into the tank when an excessive vacuum occurs within the tank during vehicle operation.

Another application for such a control valve assembly having combination pressure and vacuum relief is found in radiator systems for water cooled internal combustion engines wherein a coolant recovery container is connected to a high point on the radiator. In such systems one operating mode includes thermal expansion of liquid coolant and overflow outwardly of the radiator through the coolant recovery system to an external overflow container. The thermal expansion produces a pressure increase in the system which opens a pressure relief valve to discharge liquid coolant into the overflow container. Conversely, when the radiator cools a vacuum condition is produced therein which is relieved by a vacuum relief valve. The container is vented so that ambient pressure will act on collected liquid in the container and force it back through the system into the radiator for maintaining a maximized coolant level therein.

Examples of evaporative emission control systems having combination pressure vacuum relief valve assembly is set forth in U.S. Pat. No. 3,937,358 issued Feb. 10, 1976, to Smith et al. A representative system showing an in-line combination pressure vacuum and relief valve assembly suitable for either use in a gas container system or a radiator system is set forth in U.S. Pat. No. 3,621,871, issued Nov. 23, 1971, to Gute et al.

In such systems, it is desirable to include valving components therein that are self-cleaning during valve operation. An example of a valve assembly having such self-cleaning capabilities is set forth in the aforesaid U.S. Pat. No. 3,937,358 which shows separate, fixed resilient inverted cone elements associated with snap acting diaphragms for fluid pressure control. In such arrangements, the cone elements include flexible skirts that are wiped clean by a lip segment on each of the diaphragms to assure a positive seal therebetween.

An object of the present invention is to provide improved, self-cleaning valve seats in a proper type control valve assembly having vacuum and pressure relief components located in coaxial relationship between opposite end openings of the valve assembly.

Still another object of the present invention is to provide an improved pressure vacuum relief valve assembly including a single resilient element having a pair of reversely formed conical seal surfaces thereon, one of which is spring biased against a fixed valve seat and wiped thereacross to maintain a clean pressure relief seal surface within the valve assembly and wherein the single valve element further has its other conical surface spring biased against a ball check valve element which is wiped with respect to the other conical surface to define a self-cleaned vacuum relief seal surface.

Yet another object of the present invention is to provide an improved, easily assembled pressure vacuum relief valve assembly of the poppet type including a unitary, resilient valving element with a radially outwardly directed flexible skirt thereon forming a first conical surface, biased against an annular fixed valve seat within the valve assembly by a pressure relief spring and wherein the skirt is wiped against the fixed seat to maintain a clean, pressure seal within the valve assembly and wherein the unitary element includes a central opening therethrough for vacuum relief, the central opening being closed by a ball check valve element biased against a centrally located, second conical surface on the resilient valving element and wherein the ball element has its surface wiped with respect to the second conical surface to maintain a clean, vacuum seal within the valve assembly.

Yet another object of the present invention is to provide a pressure vacuum relief valve assembly as set forth in the preceding object including an outer housing connected to a filler neck of a vehicle fuel system to align the valve components within the valve assembly in operative relationship to maintain controlled pressure conditions within a gas container.

A still further object of the present invention is to provide a pressure vacuum relief valve assembly as set forth in the penultimate object located within an in-line housing connected to either a gas container or a radiator.

Further objects and advantages of the present invention will be apparent from the following description, reference being had to the accompanying drawings wherein a preferred embodiment of the present invention is clearly shown.

Figure 1:
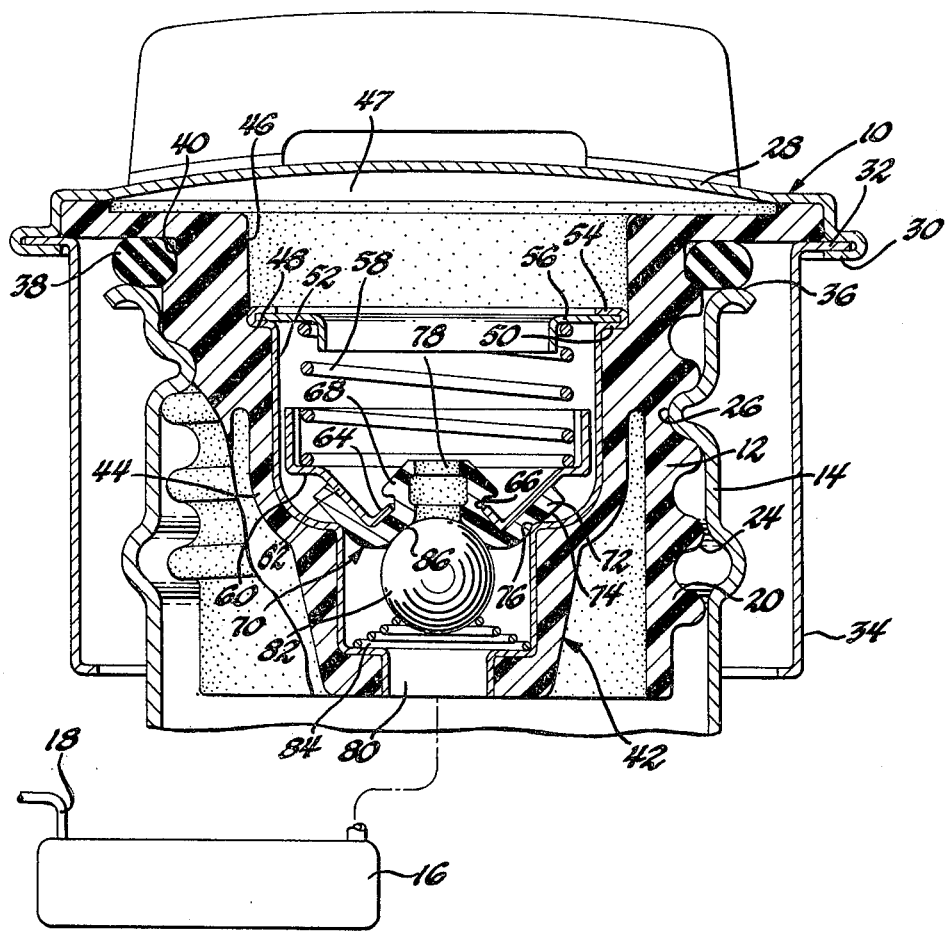
FIG. 1 is a view in vertical section of a gas cap including the pressure vacuum relief valve assembly of the present invention in association with a gas tank for controlling evaporative emissions therefrom.

Referring now to the drawings, in FIG. 1 a fuel cap 10 is illustrated. It includes a plastic closure 12 preferably made of Delrin 500, an aceytal resin made by Du-Pont Company or Valox 310, a polyester resin made by General Electric Company. The closure 12 is associated with a fuel filler neck 14 that defines a fuel opening into a fuel tank or container 16 of a semi-closed fuel supply system with known evaporative emission controls. A fuel suction pipe 18 is in communication with a low point in the container 16 and with a pump to discharge fuel from the container 16 during vehicle operation.

The closure 12 includes a depending tubular skirt portion 20 having a helical external thread 24 formed thereon that is threadably engaged with an internal thread 26 on the filler neck 14.

The fuel cap 10 includes a cover 28 with a peripheral edge 30 reversely bent to engage an outwardly directed flange 32 on a dust tube 34 that is located circumferentially and radially outwardly of an upper seal surface 36 on the filler neck to define a dust barrier therearound. An annular O-ring seal 38 supported in a circumferential groove 40 in the closure 12 is seated in sealing engagement with the surface 36 when the cap 10 is in place on the filler neck 14.

In accordance with the present invention, the cap 10 includes an improved, internally located pressure and vacuum relief valve assembly 42 of the poppet type. More particularly, the valve assembly 42 includes a housing 44 having an upper bore 46 therein in communication with a chamber 47 between housing 44 and cover 28. Chamber 47 communicates to atmosphere. The bore 46 has a shoulder 48 thereon to supportingly receive a connector flange 50 of a sheet metal valve support 52. The support 52 includes an annular flange 54 rebent into engagement with a spring collar 56 that is fixedly located to supportingly receive one end of a pressure relief spring 58 having the opposite end thereof seated in an inverted cup member 60. Member 60 has a conical dependent segment 62 thereon with a reversely bent edge 64 formed continuously circumferentially therearound. The bent edge 64 defines an opening 66 in the dependent segment 62 for supportingly receiving an undercut apex 68 on an improved resilient multiple purpose seal element 70.

More particularly, the seal element 70 includes a radially outwardly directed conically configured, flexible skirt 72 thereon which is backed by the cup member 60. The skirt 72 has an annular sealing surface 74 thereon that is spring biased into sealing engagement with a fixed, annular pressure seal valve seat 76.

The configuration of the skirt 72 is such that the pressure spring 58 will bias it against the seat 76 to center it thereon and produce a wiping action between the surface 74 and the seat 76 so as to wipe dust praticles and the like therefrom to produce a self-cleaning action between the seal element 70 and the seat 76 during valve assembly operation thereby to assure a positive pressure seal.

Additionally, the seal element 70 includes a central opening 78 therethrough defining a vacuum relief passage through the valve assembly 42. The passage 78 is in communication with the atmopheric chamber 47 and further communicates with a valve passage 80 that is connected through the filler neck 14 to the tank 16. Within the passage 80 is located a ball check valve 82 spring biased by a conically configured vacuum relief spring 84 upwardly against the seal element 70. More particularly, the seal element 70 includes a second conical sealing surface 86 thereon that is radially inwardly convergent and formed as a reverse curve with respect to the conical surface 74 on the flexible skirt 72.

Under conditions where vacuum is produced within the gas tank 16 the atmospheric pressure in chamber 47 will act on the exposed portion of the ball check valve 82 covering opening 78 to compress the spring 84 and thereby communicate the opening 78 with the passage 80. Atmospheric air then flows into the tank 16 so as to relieve the vacuum condition therein.

Conversely, under conditions where an excessive pressure build-up occurs within the tank 16, pressure will act on the exposed surface of the valve element 70 within the passage 80 to lift the seal element 70 upwardly from the fixed valve seat 76 to cause pressure relief through the chamber 47 to atmosphere.

The vacuum relief and pressure relief operation of the valve assembly 42 is of the poppet type. As previously indicated, the specifically configured surfaces 74, 86 of the valve element 70 will produce a self cleaning wiping action of the surface 74 when it engages seat 76 following pressure relief.

Likewise, following vacuum relief, when the ball check valve 82 moves into engagement with the conical surface 86 a like self-cleaning wiping action will occur therebetween. In either case, particles on valve element 70 at surface 74 or surface 86 thereon are removed and as a result the valve assembly 42 will positively seat and seal so as to define a true semi-closed pressure control system for use in evaporative emission control arrangements and the like.

Figure 2:
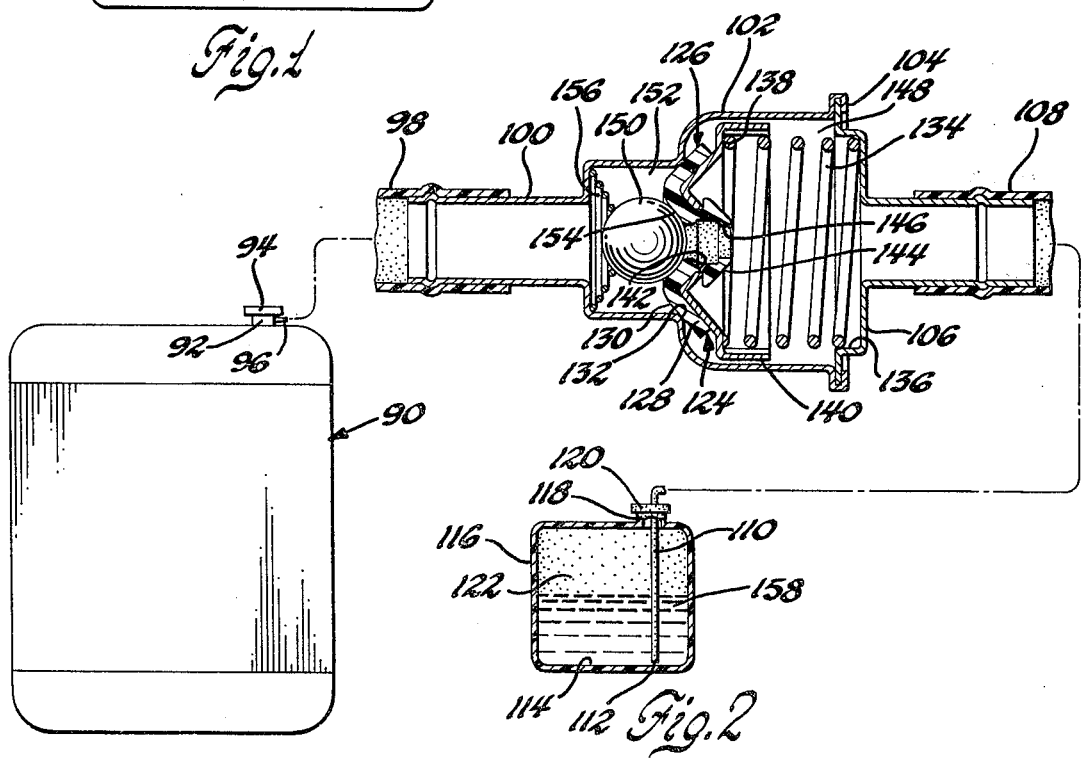
FIG. 2 is a diagrammatic view of a radiator coolant overflow collection system including an in-line valve assembly of the present invention, in longitudinal section.

The second embodiment of the invention illustrated in FIG. 2 includes an automotive radiator 90 for association with a liquid coolant system for an internal combustion engine. A filler neck 92 at the top of radiator 90 is closed by a cap 94. The filler neck 92 includes a vent tube 96 thereon connected by means of a conduit 98 to a tubular fitting 100 on an in-line valve housing 102. Housing 102 has an opposite end thereof with a rebent flange 104 to secure a second tubular fitting 106 on the housing 102. Fitting 106 is connected by a conduit 108 to an overflow tube 110 having an open end 112 therein located adjacent the bottom 114 of a coolant overflow container 116. The container 116 includes a fill neck 118 closed by a vented cap 120 that communicates the interior 122 of the container with atmosphere.

The housing 102 encloses a valve assembly 124 including a pressure relief component and a vacuum relief component configured like those illustrated in the embodiment of FIG. 1. In this case, the components are in an in-line configuration and the housing 102 can be located within the system apart from cap components 94, 120 therein. Of course it should be understood that the valve components 124 can be included within the cap 94 as shown in the embodiment in FIG. 1.

The in-line configuration shown in FIG. 2 more particularly includes a combination pressure and vacuum seal element 126. As was the case in the first embodiment, the seal element 126 is made of resilient material and includes a flexible skirt 128 thereon having a conically configured outer surface 130 that is seated against a fixed annular seat 132 on the housing 102. This configuration produces a self-centering and self-cleaning action or wiping movement of the surface 130 with respect to the fixed seat 132 when the seal element 126 is spring biased by means of a pressure spring 134 into a closed position as shown in FIG. 2. The pressure spring 134 has one end thereof seated in a shoulder 136 on the fitting 106 and has the opposite end thereof seated against a shoulder 138 of a retainer cup 140 for the seal element 126. As in the previous case, the retainer cup 140 includes a central opening 142 therethrough in which is fit an undercut apex 144 on seal element 126. Apex 144 has a central opening 146 formed therethrough defining a vent or vacuum relief opening. The opening 146 is in communication with an internal chamber 148 of the valve assembly leading to fitting 106. Opening 146 further communicates across a ball check valve 150 with a chamber 152 leading to the fitting 100. In the illustrated arrangement, the ball check valve 150 is spring biased into engagement with a flexible, radially inwardly directed conical surface 154 formed on the seal element 126 and convergent toward the central opening 146. It likewise produces a self-cleaning wiping action as the ball check element 150 is moved into and out of engagement therewith. A conical, vacuum control spring 156 is supported by the fitting 100 and against the ball check element 150 to maintain it in a closed biased position during normal operation. As a result, the system shown in FIG. 2 is semi-closed.

In the event that an excessive pressure condition occurs within the radiator 90 as produced by expansion of liquid coolant therein the pressure is transmitted to the chamber 152 where it acts against the exposed area of the seal element 126 to compress the pressure spring 134 to produce a poppet opening of the seal element 126 and a resultant large area annular flow region through the housing 102 between the fitting 100 and the fitting 108. Excessive coolant is thereby dicharged through the tube 110 into the container 116 to produce a partial fill of liquid coolant 158 therein. Preferably a coolant level is always maintained over the outlet 112.

During conditions of operation where the radiator 90 is cooled, the thermally expanded liquid coolant therein will contract to produce a vacuum condition within the radiator 90. Atmospheric pressure in the chamber 122 of the container 116 will act through the collected liquid column in the container and thence force liquid coolant in a reverse direction through the in-line valve components 124 and to the chamber 148 and thence through the central opening 146 to act against the ball check valve 150 to displace it from the conical surface 154 and thereby allow flow of coolant back into the radiator 90.

Again, in this arrangement an easily assembled poppet acting valve is defined by use of the specifically configured pressure and vacuum seal element 126.

The perimeter of the seal contact between the ball check element and the fixed annular seat in the illustrated embodiments of FIGS. 1 and 2 will produce a high unit pressure seal condition during equilibrium conditions of operation wherein it is desired to maintain a semi-closed system. A further desirable feature is that the conical surface in the illustrated arrangements is maintained at 45° so that the seal elements (either 70 or 126) will continually compensate for dimensional growth along their conical surfaces because of expansion properties of the material. The apex connection of the seal elements represents a fixed ground point for growth of the seal element so as to assure semi-closed seal conditions within either the valve assembly 42 shown in FIG. 1 or the valve assembly 124 shown in the embodiment of FIG. 2.

While the embodiments of the present invention, as herein disclosed, constitute preferred forms, it is to be understood that other forms might be adopted.

The embodiments of the invention in which an exclusive property or privilege is claimed are defined as follows:

1. A pressure vacuum relief gas cap including a closure for sealing between a first source of pressure and a second source of pressure, a valve housing on said closure having a bore therethrough, wall means in said housing including a fixed valve seat forming an opening between said first and second sources of pressure, a seal element having an apex and a skirt of conical configuration, means including a movable carrier connected to said apex and a compression spring located coaxially of said seal element and against said carrier for supporting said skirt coaxially of said opening for engagement with said fixed valve seat to seal said opening against flow therethrough, said compression spring being responsive to a predetermined pressure differential between said first and second sources of pressure to cause said skirt to open to produce an annular open flow area between said fixed valve seat and said skirt, said compression spring being responsive to a reversal of pressure differential between said first and second pressure sources to close said skirt against said fixed valve seat to wipe the surface of said skirt, and relief valve means to open communication between said first and second sources of pressure when vacuum occurs in said second source, said seal element including a vacuum opening therethrough and further including a reversely bent segment forming a conical vacuum seal surface, said relief valve means including a ball check valve sealing said vacuum seal surface to control flow through said vacuum opening in response to vacuum in said second source.

2. A valve assembly for controlling flow between a first source of pressure and a second source of pressure comprising a valve housing having a bore therethrough, wall means in said housing including a fixed valve seat forming an opening between said first and second sources of pressure, a seal element having an apex and a skirt of conical configuration, means including a movable carrier connected to said apex and a compression spring located coaxially of said seal element and against said carrier for supporting said skirt coaxially of said opening for engagement with said fixed valve seat to seal said opening against flow therethrough, said compression spring being responsive to a predetermined pressure differential between said first and second sources of pressure to cause said skirt to open to produce an annular open flow area between said fixed valve seat and said skirt, said compression spring being responsive to a reversal of pressure differential between said first and second pressure sources to close said skirt against said fixed valve seat to wipe the surface of said skirt, said seal element including a vacuum opening therethrough and a reversely bent segment forming a conical vacuum seal surface, vacuum relief means including a ball check valve sealing said vacuum seal surface to control flow through said vacuum opening in response to vacuum in said second source.

3. A valve assembly for controlling flow between a first source of pressure and a second source of pressure comprising a valve housing having a bore therethrough, wall means in said housing including a fixed valve seat forming an opening between said first and second sources of pressure, a seal element having an apex and a reversely curved skirt defining first and second conical seal surfaces, means including a movable carrier connected to said apex and a compression spring located coaxially of said seal element and against said carrier for supporting said skirt coaxially of said opening for engagement of said first conical seal surface with said fixed valve seat to seal said opening against flow therethrough, said compression spring being responsive to a predetermined pressure differential between said first and second sources of pressure to cause said skirt to open to produce an annular open flow area between said fixed valve seat and said first conical seal surface, said compression spring being responsive to a reversal of pressure differential between said first and second pressure sources to close said first conical seal surface against said fixed valve seat to wipe it clean, and relief valve means to open communication between said first and second sources of pressure when vacuum occurs in said second source, said relief valve means including a ball check valve movable into and out of engagement with said second conical seal surface to wipe it clean during vacuum relief control.

4. A pressure vacuum relief gas cap including a closure for sealing between a first source of pressure and a second source of pressure, a valve housing on said closure having a bore therethrough, wall means in said housing including a fixed valve seat forming an opening between said first and second sources of pressure, a resilient seal element having an apex and a reversely curved skirt defining first and second conical seal surfaces, means including a movable carrier connected to said apex and a compression spring located coaxially of said seal element and against said carrier for supporting said skirt coaxially of said opening for engagement of said first conical seal surface with said fixed valve seat to seal said opening against flow therethrough, said compression spring being responsive to a predetermined pressure differential between said first and second sources of pressure to cause said skirt to open to produce an annular open flow area between said fixed valve seat and said first conical seal surface, said compression spring being responsive to a reversal of pressure differential between said first and second pressure sources to close said first conical seal surface against said fixed valve seat to wipe the surface of said skirt, and relief valve means engageable with said second conical seal surface to control communication between said first and second sources of pressure when vacuum occurs in said second source.

5. An in-line assembly for controlling flow between a first source of pressure and a second source of pressure, comprising opposite end fittings in communication with said first and second sources of pressure, respectively, a valve housing connected to each of said fittings having a bore therethrough, wall means in said housing including a fixed valve seat forming an opening between said first and second sources of pressure, a seal element having an apex and a flexible skirt of conical configuration, means including a movable carrier connected to said apex and a compression spring located coaxially of said seal element and against said carrier for supporting said skirt coaxially of said opening for engagement with said fixed valve seat to seal said opening against flow therethrough, said compression spring being responsive to a predetermined pressure differential between said first and second sources of pressure to cause said skirt to open to produce an annular open flow area between said fixed valve seat and said skirt, said compression spring being responsive to a reversal of pressure differential between said first and second pressure sources to close said skirt against said fixed valve seat to wipe the surface of said skirt, and relief valve means to open communication between said first and second sources of pressure when vacuum occurs in said second source, said seal element including a vacuum opening therethrough and further including a reversely bent segment forming a conical vacuum seal surface, said relief valve means including a ball check valve sealing said vacuum seal surface to control flow through said vacuum opening in response to vacuum in said second source.

* * * * *